United States Patent [19]

Goss et al.

[11] Patent Number: 4,995,912

[45] Date of Patent: Feb. 26, 1991

[54] MILL SCALE DE-OILING

[75] Inventors: Michael Goss, Houston; John E. Mincy, Richmond, both of Tex.

[73] Assignee: Nalco Chemical Company, Naperville, Ill.

[21] Appl. No.: 471,344

[22] Filed: Jan. 29, 1990

[51] Int. Cl.$^5$ .............................................. C22B 7/00
[52] U.S. Cl. ........................................ 134/2; 134/26; 134/40; 75/962
[58] Field of Search .................. 75/962; 134/40, 2, 26

[56] References Cited

FOREIGN PATENT DOCUMENTS 3232915  3/1984  Fed. Rep. of Germany ...... 134/140

OTHER PUBLICATIONS

*Physical Chemistry of Extractive Metallurgy Proc. Int'l. Symp.*, pp. 479–493, 1985.

*Primary Examiner*—Melvyn J. Andrews
*Attorney, Agent, or Firm*—Robert A. Miller; Donald G. Epple

[57]  ABSTRACT

A particular scrubbing agent/detergent formulation useful in removing contaminated oils and oily components from mill scale generated in a steel mill as disclosed. The formulation is based around medium aliphatic and heavy aromatic naphthas, linear and/or branched alkyl phenols, alkoxylated alkyl phenols, pentaethylene hexamine partial fatty acid amides, and alkyl and/or aromatic acid imidazolines. Optionally, fatty alcohol sulfonates can be used to protect the de-oiled mill scale surfaces from reabsorption of contaminating oily components.

4 Claims, No Drawings

MILL SCALE DE-OILING

Introduction

Mill scale is a waste iron by-product formed during the steelmaking process and particularly during the processes in the steel plant which occur after the blast furnace which processes permit steel ingots to be formed into various sheet, tube, and other products.

Each of the operations which are used to form the final steel products normally involve lubricants both in the process of manufacturing the final product as well as lubricants used in the equipment exposed to hot steel during the formation of the final steel products. As a result, oil contamination of mill scale, which is an iron oxide by-product which is formed during the steelmaking process and during the processes that finally make steel products, occurs.

This oil contamination of the mill scale limits its recycle back into the steelmaking process, because the heat involved liberates hydrocarbons and various oxides of hydrocarbons which contaminate the air and do not permit the steel operator to meet environmental quality demands. In addition if the mill scale is recycled to the sinter plant which prepares the feed to blast furnaces, the oil which contaminates the mill scale results in operational problems by fouling fan blades and filter bags in the bag house as well as producing the excessive hydrocarbon emissions mentioned above.

The steel industry as a whole is faced with increasing amounts of mill scale which cannot be used because of oil contamination which results both in higher raw materials costs and higher disposal costs. Mill scale can account for up to about six (6) weight percent of the total iron used in the process of making steel.

It is quite surprising in fact to realize that a typical steel mill produces from about 100 to as much as 750 tons per day of oily mill scale, all of which is contaminated with hydrocarbon oils to some degree or another.

When the oil contamination on a mill scale reaches a level of from 0.1% to 5% and above, this mill scale is unusable for recycle into the sinter plant because of the problems caused by excessive hydrocarbon emissions, fouling of fan blades, blinding of filter bags, and the like.

Various approaches have been used in the past to attempt to remove this oil from mill scale, which approaches have included solvent extraction using a hydrocarbon solvent or a non-aqueous solvent in which the hydrocarbon oils were soluble, kiln processes which vaporized and oxidized the oil thereby reducing their content on the mill scale, and water extractions of the mill scale in the presence of large concentrations of surfactants and detergents which were used for the purpose of removing oil from the mill scale.

For various reasons, none of these approaches have been successful in commercial operation. Solvent extractions are expensive and create other hazards such as explosion hazards as well as air pollution hazards and the like. Heated kiln processes which vaporize and/or oxidize oily contaminants still do not achieve acceptable hydrocarbon emissions levels, and the processes operated in the past do not achieve permitted air quality levels. The use of detergents at high concentrations create foaming problems and have not routinely been operable at economic levels.

It is therefore an object of this invention to provide a process which will remove sufficient oil from mill scale to allow the recycle of this iron-bearing mill scale material back into the steelmaking process without threat to the environment through high hydrocarbon emissions or through any other means.

It is also a goal of this invention to achieve a de-oiling process for mill scale which will remove and recover oils from mill scale as well as provide a low hydrocarbon bearing mill scale iron oxide material for recycle directly into the blast furnace or through the sinter plant which manufactures blast furnace feeds.

It is a goal of this invention to develop a process to de-oil mill scale, allow its recycle back into the steelmaking process, and achieve this in a shorter time scale than can be achieved with the practice of other technologies. This also shall be done without providing major impact on air quality.

It is a further object of this invention to accomplish the de-oiling of mill scale by using a particular surface active agent to remove entrained oils and lubricants from iron oxide slurries formed by suspending contaminated mill scale in water, and then adding an oil removing effective amount of a surface active agent to remove contaminating oils from the surface of iron oxide particles making up this mill scale and either suspending, dissolving, or emulsifying this oil in the water used to form the slurry.

It is a further object to then phase separate the cleaned suspended iron oxide and other solid material making up the contaminated mill scale from the oil contaminated waters formed by washing the suspended contaminated mill scale in water containing an effective amount of a surface active agent comprising an admixture of aliphatic and aromatic naphthas, pentaethylene diamine-tall oil acid partial amides, ethoxylated nonyl phenols, and naphthenic acid, amido naphthenyl imidazolines.

It is a further object of this invention to accomplish the removal of this oily mill scale contamination to obtain mill scale either in the presence of other chemical treating agents which may be used simultaneously with the treatments above. Such other treating agents are preferably highly surface active alkyl sulfonates.

By practicing the technology of the inventions to be described below, it is possible to remove at least 90% of the oil originally contaminating an oily mill scale and may also be possible to remove up to and perhaps more than 95% of this contaminating oil from the original contaminated mill scale.

Prior Practices of De-Oiling Mill Scale

Mill scale de-oiling has been achieved by techniques referred to as critical fluid extraction which techniques have been described by Cody, et al. at a "Symposium on Iron and Steel Pollution Abatement Technology for 1982", which symposium was held in Pittsburgh, Pa., from Nov. 16–18, 1982.

Further, investigations were carried out in the United States, Japan, and West Germany on techniques for recycle of oily mill scale sludges in steel mills, which techniques were presented in an article entitled "Handling of Mill Scale Sludges" which appeared in "Ertzmetal", volume 37, no. 6, published in June 1984, on pages 302–305. The abstract of the article does not mention particular techniques other than the physical handling of oily mill scale sludges.

An article entitled "Untersuchunger Zur Entoelung Von Walzzunder" by Supp, et al., published in Technische Mittellunger Krupp, Forschungsberichte, volume 33, no. 3, published December 1975, pages 89–92, announced the washing of gravel filters in a water recirculating system used on Krupp's wide strip hot rolling mills producing a sludge contained heavily oiled fine mill scale and teaches a method of treating this sludge and water suspension by dewatering the sludge in a circular thickener and de-oiling the effluent by agitating with high concentrations of an alkaline cleaning agent at high temperatures, then passing the cleaning agent suspension of mill scale through a centrifugal separator to remove solids.

An article entitled "Characterization and Utilization of Iron Bearing Steel Plant Waste Materials" by Fosnaught presented at a conference entitled "Physical Chemistry of Extractive Metallurgy" (proceedings of an international symposium held at the AIME annual meeting in New York, N.Y., U.S.A., Feb. 24–28, 1988) described an investigation to obtain the scope of problems associated with recycling various waste metal oxide materials generated at Inland Steel. The techniques summarized in this report include the cold bonding agglomeration method for producing waste oxide agglomerates without de-oiling, and the use of various techniques for beneficiating blast furnace flue dust and soaking pit rubble to upgrade these materials to be utilized in the sinter plant or ironmaking operations. No attempt to de-oil these mill scales was mentioned.

An article entitled "Removal of Organics From Recycled Materials" by De Filippi, published in "Conservation and Recycling", volume 8, nos. 3–4, 1985, taught solvent extraction technology to recover waste oils contaminating mill scale and machining scraps. Solvent extraction technologies taught used common organic solvents to remove mill scale contamination to achieve do-oiled materials with oil levels below 0.1% by weight.

In an article entitled "Steel Mill Residue Recycling Processes" by Margolin, published in "Conservation and Recycling", volume 8, nos. 3–4, 1985, several conventional and non-conventional recycling processes were summarized, none of which are the processes of the instant invention.

In an article entitled "Republic Steel Recycling Over 85% of Waste Water From Steel Mill" appearing in "Civil Engineering" (New York), volume 50, no. 6, June 1980, pages 102–103, the anonymous author describes a recycled operation for suspended particles of scales and oils and greases obtained in the Republic Steel Mill operating in Canton, Ohio. This scale is removed by adding chemicals that clump together small particles of scale to form larger particles which settle out of waste water by gravity and provide for the possibility of oil being skimmed off the top of the clarifier.

In an article entitled "Recycling of Steel Plant Waste Materials" by Ralph, appearing in "Steel Times", volume 204, no. 8, August 1976, pages 718–724, the author describes the considerable tonnages of iron bearing waste materials generated in modern iron and steelmaking processes, but primarily emphasizes control of fumes and dusts from furnace gas cleaning plants and scales and sludges from steel casting and hot rolling operations as being the source of these waste iron oxide bearing materials. The author suggest installation of more efficient fume removal equipment.

In an article entitled "Treatment of Oily Waste From a Steel Mill", by Woods, et al., published in the "Journal of Water Pollution Control Federation", volume 45, no. 10, October 1973, the theory of oily waste water stability was reviewed. Laboratory scale processes to describe treatment of these oily wastes are presented. Although the authors mentioned relatively high revolution per minute mixing, this mixing was to accomplish an oil water phase separation and was not related to mill scale treatments.

In an article entitled "Dewatering of Steel Mill Sludges by Belt Press Filtration", by Patzelt, et al., presented at the "Proceedings of the 39th Industrial Waste Conference" in West Lafayette, Ind., U.S.A., May 8–10, 1984, the author describes the treatment of various steel mill sludges including sludges formed by suspension of oily mill scale in belt press filtrations.

In an article entitled "Recycling of Ferrous Steel Plant Fines, State-of-the-Art", by Fosnaught, presented in "Iron and Steel Maker", volume 8 no. 4, April 1981, pages 22–26, the author presents a summary of the treatment of various flue dusts, sludges and mill scale, said treatment primarily involving sintering, green balling, and high temperature kiln processing techniques.

An invention by von Bormann, which appears in European Appln. No. 157805, filed Oct. 16, 1985 describes oil contaminated mill scales being processed in a washing drum with countercurrent contact with a wash liquor of pH 12–14, where the wash liquor contains various detergents. The process includes the solids being lifted by blades on the washing drum, a dewatering unit, and a device for displacing the wash liquor with water.

In addition to the above, various patents have been applied for or issued which have as their goals the treatment and recovery of mill scale for recycle into the steel mill. These patents and other references are listed below and all U.S. Patents are incorporated herein by reference.

ARTICLES

1. Steel Industry Sludge is Being Reused Pat. Report (Practical Available Technology), Env. Sci. & Technology 9(7), 624 (1975).

2. Recycling of Ferrous Steel Plant Fines, State-of-the-Art, Iron and Steelmaker, volume 8, no. 4, 1981, pp. 22–26.

3. Characteristics and Utilization of Iron-Bearing Steel Plant Waste Materials, Donald R. Fosnacht, Inland Steel Co. Research Laboratory, East Chicago, Ind. 46312.

4. Republic Steel Recycling Over 85% of Wastewater From Steel Mill, Civil Engineering (New York) vol. 50, no. 6 June 1980, pp. 102–103.

5. Recycling of Steel Plant Waste Materials, Steel Times, vol. 204, no. 8, August 1975, pp. 718–724.

6. Pollution Control and Upgrading of Mineral Fines with Bitumen, Authors: R. Herment; P. Bazin; J. E. M. Corkill; Miner. Enviorn., Proc. Intern. Symposium, Meeting Date 1974, pp. 245–259. Edited by: Michael J. Jones, Inst. Min. Metall., London, U.K.

7. Manufacture of Sponge Iron; Authors: Takeo Omura, Ritsuo Okabe, Yoshiaki Maeda, & Kiyoshi Makino; Jpn. Kokai Tokkyo Koho No. JP 61/183402 (86/183402), 16 Aug 1985, 5 pages.

8. Removing Oils and Fats from Bulk Materials; Authors: Rudolph Heusch, Udo Werner, & Langer; Ger. Offen. No. DE 3232915 A1, 8 Mar. 1984, 12 pages.

9. Moisture Adjustment for Sintering Feed; Jpn Kokai Tokkyo Koho JP 58/147524 A2 (83/147524), 2 Sep. 1983, 3 pages.

10. Recycling Oily Mill Scale; Author: Donald R. Fosnacht; Can. CA 1154595 A1, 4 Oct. 1983, 24 pages.

11. Use of Metal-Oil Scale in the Production of Keramzit; Authors: G. I. Knigina, V. F. Panova, P. A. Kravtsov; Prom-st. Stroit. Mater., Ser. 11 (Nauchno-Tekh. Ref. Sb., (7), 6–8.

12. Development of a De-oiling Process for Recycling Millscale; Author: Derek S. Harold; Recycling Steel Ind., Proc. Process Technol. Conf., 1st, 184–187; Iron Steel Soc. AIME: Warrendale, Pa.

13. How to Simplify Lube Oil System Cleanup; Authors: L. D. Martin, J. O. Young, W. P. Banks; Hydrocarbon Process; 56(1), 88–90.

14. Experience in the Use of Mill Scale in the Production of Acid Pellets; Authors: James M. Fitzpatrick, Terence J. Roberts, Ian A. Thomson; Pap. Symp. Pellets Granules, 181–9. Australas. Inst. Min. Metall.: Parkville, Australia.

15. Agglomeration as an Aid in Treating Waste Materials; Authors: Karl C. Dean, Richard Haven, Espiridion G. Valdez; Proc. Bienn. Conf. Inst. Briquet. Agglom., 13, 23–66.

U.S. Patents

1. U.S. Pat. No. 3,844,943 Title: METHOD AND APPARATUS FOR PROCESSING WASTE WATER SLIMES OF STEEL MILL WATER TREATMENT SYSTEMS Inventor: Leonard A. Duval Filed: June 18, 1973

2. U.S. Pat. No. 4,326,883 Title: PROCESS FOR DEOILING AND AGGLOMERATING OIL-BEARING MILL SCALE Inventor: Arthur M. Schwarz Filed: July 10, 1979

3. U.S. Pat. No. 4,585,475 Title: METHOD FOR RECYCLING OILY MILL SCALE Inventor: Donald R. Fosnacht Filed: Oct. 23, 1981

4. U.S. Pat. No. 4,738,785 Title: WASTE TREATMENT PROCESS FOR PRINTING OPERATIONS EMPLOYING WATER DISPERSIBLE INKS Inventors: Jesse R. Langston, Frank J. Tortorici, & Fred D. Barlow, Jr. Filed: Feb. 13, 1987

5. U.S. Pat. No. 4,288,329 Title: DE-OILING AND AGGLOMERATING OIL-BEARING MILL SCALE Inventor: Arthur M. Schwarz Filed: Apr. 27, 1982

Foreign Patents

1. Offenlegungsschrift No. DE 3043220 A1
2. Patentschrift No. DE 3120463 C1
3. Patentschrift No. DE 3146809 C1
4. Patentschrift No. DE 3223011, Assignee Thyssen Ind. AG, Inventors: G. Weber, B. Gover.
5. No. PCT/DE 84/00183, "Process, Plant and/or Device for Preparing Oil-Coated Scales or Similar Materials", Inventor: Gerhard F. Hiebsch, Mar. 14, 1985.
6. Patent Appln. Republic of South Africa, No. 828475, "Method and Apparatus for Roll or Mill Scale and for Extracting Crude Oil from Oil-Containing Minerals", Applicant: AM Thyssenhaus 1, 4300 Essen, Germany.
7. Eur. Pat. Appln. No. EP 80589 A1 8 June 1983 "Method and Equipment for Cleaning Roll Scales Contaminated with Greasy Substances, Especially Oil, and for the Production of Petroleum from Oil-Containing Minerals", Inventor: Guenter Wever; Grover, Brijmohan.

8. Jpn. Kokai Tokkyo Koho No. JP 56/79180 (81/79180), 29 Jun 1981 "Coal Liquefaction", Assignee Sumitomo Metal Industries, Ltd.

9. Ger. Offen. No. DE 2920379, 6 Dec. 1979, "Removal of Oil and Recovery of Metal from Rolling Mill Scale", Inventor: Paul Richard Pack.

10. Japan Kokai No. JP 52/93603 (77/936031), 6 Aug. 1977, "Recycling of Fine Mill Scale and Oil Mixtures", Inventors: Jutaro Noda, Yoshiji Obara, & Shinichi Sasaki.

11. Japan Kokai No. JP 52/73181 (77/73181), 18 June 1977 "Separation from Oil-Containing Gases", Inventors: Toru Matsumura Michitaka Fujita, & Shoji Nishimura.

12. Japan Kokai No. JP 52/111492 (77/111492), 19 Sep. 1977 "Use of Sludge Containing Iron Oxide", Inventor: Shoichi Maruo.

13. Japan Kokai No. JP 51/33486 (76/33486), 20 Sep. 1976 "Treatment for Oil and Scale Mixture", Inventors: Tamao Arai, Masaharu Shimizu, Kotaro Mitani, Kazuaki Tanikawa, & Yasutoshi Matsuo.

Of particular note in the above list of patents, the patent to Gartner, et al., West German No. 3,146,809, describes a method of de-oiling mill scale by washing the scale in a slurry in a wash medium classifying it in terms of size to recover oil free coarse particles and a slurry of fine particled mill scale which is then subjected to hydrocyclone washing to recover oil-free medium size particles, then clarifying the remaining slurry to separate out fine particles of mill scale. In the process the slurry is subjected to at least one flotation stage to give an oil concentrate from which the oil is then separated. Preferably in the process taught by Gartner, the slurry is subjected to a magnetic separation prior to oil flotation. Other of Gartner's patents include West German Patent No. 3,120,463, and West German Patent No. 3,043,220.

Most of the Gartner references cited above involve hydrocyclone washing after particle sizing, then slurrying of mill scale fines, and a magnetic separation to achieve an oil-free medium size grain agglomerate of mill scales.

Other techniques have included burning off the contaminated oil by contacting the contaminated mill scale with the liquid slag from steel refining stages at temperatures above the ignition temperature of the oil. Again these techniques provide for high environmental pollution.

THE INVENTION

We have invented a process for removing oily contaminants from mill scale which process comprises:
(a) suspending oily mill scale in water containing an effective de-oiling amount of a formulation containing the ingredients:

| | |
|---|---|
| (1) medium aliphatic naphtha | 30–60 wt. % |
| (2) heavy aromatic naphtha | 1–7.5 wt. % |
| (3) linear and branched alkyl phenols | 5–15 wt. % |
| (4) alkoxylated alkyl phenols | 5–20 wt. % |
| (5) penta ethylene hexamine, partial fatty acid amide | 0.5–2.0 wt. % |
| (6) alkyl and/or aromatic acid imidazolines | 1–5.0 wt. % | thereby forming an oily mill scale suspension; then (b) mixing said suspension to achieve dissolution and emulsion suspension of oily contaminants in water, thereby forming a de-oiled mill scale suspended in oily water, (c) separating the de-oiled mill scale from the oily water, and (d) optionally water rinsing the de-oiled mill scale to form a rinsed mill scale which is recycled to the sinter mill; then (e) treating the oily water to remove oily contaminants from the oily water thereby recovering waste oils and treated fresh water, and then (f) recycling at least a portion of the treated fresh water to form the oily mill scale suspension of step (a), and discarding or reusing the waste oils.

In the process above, the water used to rinse the de-oiled mill scale contains, or may contain a surface absorbent attractant such as the $C_6$–$C_{10}$ alcohol sulfonate component or alkoxylated alkyl phenols, which surface attractant adsorbs on the iron/iron oxide surfaces to form an oil-repellant surface on the de-oiled mill scale, thereby preventing further oxidation and further accumulation of hydrocarbon or waste oils on the surface.

In addition, the process of our invention may also include formulations which preferably contain the following ingredients:

| | |
|---|---|
| (1) a medium aliphatic naphtha | 40–55 wt % |
| (2) a heavy aromatic naphtha | 1.5–5 wt % |
| (3) linear and/or branched alkyl alcohols | 7.5–12.5 wt % |
| (4) alkoxylated alkyl phenols | 7.5–17.5 wt % |
| (5) a polyamine, partially amidated with a fatty acid | 1–2 wt |
| (6) alkyl and/or aromatic acid imidazolines | 2–4 wt % |

In the above formulations, the linear and/or branched alkyl alcohols are those alcohols that contain from $C_4$–$C_{24}$ carbons and are preferably those alcohols which contain from $C_6$–$C_{20}$ carbon atoms. The alkoxylated alkyl phenols are those phenols which contain either linear or branched alkyl substituents at the para and/or ortho positions and which are alkoxylated at the phenol position with from 1 to 20 repeating alkoxyl groups chosen from the group consisting of ethoxyl groups, propoxyl groups, and mixtures thereof. The preferred alkoxylated alkyl phenols are those phenols derived from reacting about 1–5 moles of ethylene oxide with nonyl phenol to obtain an ethoxylated nonyl phenol containing from 1 to 5 ethoxylate units on the nonyl phenol moiety.

The polyamine-partial fatty acid amide materials are made primarily by reacting a polyamine such as pentaethylene hexamine or a bottoms product primarily containing pentaethylene hexamine with tall oil fatty acid at a mole ratio to obtain partial amidization of the fatty acid. This mole ratio can range from 0.1:| up to and including about 0.9:1.

The alkyl and/or aromatic acid imidazolines are those imidazolines that primarily contain 1—(2)—napthenic acid, amido ethyl—2—napthanyl—2—imidazoline. These imidazolines are primarily made by reacting naphthenic acid to form the imidazoline. Also, any other fatty acids containing from about 8–18 carbon atoms may be reacted under conditions which manufacture the imidazoline compounds. These imidazolines may be used in combination in our own invention. These reactions are taught in U.S. Pat. Nos. 2,995,520, Luvisi, et al., 2,267,965, Wilson, and 2,355,837, Wilson, which are incorporated herein by reference.

In the formulations above, the preferred ingredients are used such that the medium aliphatic naphtha is used at from 40–55 weight percent; the heavy aromatic naphtha is present at from 1.5–5.0 weight percent; the linear and/or branched alkyl alcohols are present at from 7.5–12.5 weight percent; the alkoxylated alkyl phenols are present at from 7.5–17.5 weight percent; the polyamine partial fatty acid amide is obtained from pentaethylene hexamine and tall oil fatty acid and is present at from 1.0–2.0 weight percent; and the imidazoline mixture is present from 2.0–4.0 weight percent.

In the process above, the oily mill scale is suspended in water which is either water obtained from a normal industrial source, or water which can be obtained from recycle after the process has been practiced, which recycled water, or treated fresh water contains little (i.e. less than 0.1% by weight) or no of the oily components contained on the starting oily mill scale and contains little (i.e. less than 0.2 weight percent) or no of the mill scale particulate matter obtained from iron/iron oxide particulates, iron oxide particulates, and the like. The oily mill scale is suspended in water at a concentration ranging from about 0.1 to about 50 weight percent, preferably from about 1 to about 40 weight percent, and most preferably from about 5 to about 35 weight percent, prior to its treatment with the active formulations which assist in the suspension, dissolution, and emulsion suspension of the oily contaminants thereby forming a de-oiled mill scale suspended in oily water.

The separation of the de-oiled mill scale from oily water may be accomplished by a number of means, including but not limited to simple filtration, simple centrifugation, settling and overflow, and the like, or combinations thereof. Standard flocculating, settling and coagulation chemical treatments may be used as well.

When the oily water is separated from the de-oiled mill scale, the oily water may be treated by a number of different chemicals to break any emulsions that have been formed to obtain an oil phase and a water phase which may be again separated according to the knowledge in the art by centrifugation, settling, skimming, and the like. The water obtained is of sufficient quality to be recycled back to form the original oily mill scale suspensions, or may be further treated and discharged at the option of the operator. The oil recovered may be wasted, burned, recovered for active components, or used in any reasonable way at the option of the operator.

The de-oiled mill scale is optionally water-rinsed with fresh water, or water which is partially or completely recovered as the treated fresh water, to obtain a rinsed mill scale which can be of sufficient quality to be recycled directly to the sinter mill and then to the blast furnace to recover iron values directly. This rinsed mill scale contains sufficiently low values of oils and other contaminants that operation in the sinter mill and blast furnace does not cause pollution problems as would be caused if the mill scale containing oily contaminants were directly recycled. The rinse water used preferably contain a fatty alcohol sulfonate having the structure: (R)—$SO_3M$, where R is a linear or branch alkyl group containing from 6 to 12 carbon atoms, and preferably from 6 to 10 carbon atoms. These materials are attracted to the surfaces of iron and/or iron oxide particulates, adsorbed thereon, and act to protect these surfaces against further readsorbance (absorbance) of fatty oils, and other components, contained on the oily mill scales. Any other strong adsorbent which is water soluble and preferably attracted to these iron/iron oxide particulate surfaces may also be used with the preferred fatty alcohol sulfonates described above.

To further exemplify our invention, the following examples are given:

EXAMPLES

Mill scale was obtained from a steel mill operating in the Southwest. This mill scale was shaken and suspended in water and the formulations taught above were used successfully to remove at least 90% of the total oil from the mill scale so suspended. The mill scale used could not be utilized by the plant's sinter mill because of excessive hydrocarbon contamination. This hydrocarbon contamination led to equipment problems such as fouling, and also led to emissions violations if the contaminated mill scale were put through the sinter plant.

The plant from which this mill scale was obtained was producing approximately 500 tons per day of this mill scale. This material was being stockpiled until processes are developed to allow recycle of this mill scale in the production of iron and steel. Plant personnel indicated that every ton of recycled mill scale scrap conserves from 3.5–4 tons of natural iron ores.

The techniques used for the evaluation of removal of the oil contaminants from this mill scale included the following:

Samples of mill scale were added to either 600 ml beakers or to enclosed and capped bottles with an equal weight of water containing formulations described above. The beakers were stirred and the bottles vigorously shaken, both for sufficient times to ensure intimate contact or reaction times (from about one minute up to about thirty minutes) In some cases, multiple agitations were done. After stirring, shaking, or otherwise agitating this admixture, the mill scale was separated from the oily emulsion formed, rinsed with water, and extracted with freon to obtain any oils or other hydrocarbonaceous contaminants still retained with the mill scale. The freon was collected and its content of oils measured by absorbance using standard spectrophotometric techniques.

Using the test methods above, and the formulations described earlier, mill scale containing from 0.3 percent up to and including 8.2 percent total oil and from about 9 to about 16.2 percent water was treated with a formulation in an aromatic solvent that contained 72.8 weight percent of a formula which itself contained 89.81 percent medium aliphatic naphtha, 2.14 percent of a reaction product of penta ethylene hexamine bottoms with tall oil fatty acid to obtain a partial amide reactant product, 0.32 weight percent methanol, 1.7 weight percent dodecylbenzenesulfonic acid, and 5.9 weight percent of ethoxylated nonyl phenol having a 40/60 weight ratio of nonyl phenol to ethylene oxide. This formulation also contained 13.6 percent of another ethoxylated nonyl phenol which had a nonyl phenol ethylene oxide ratio of 29/71. The formulation dissolved in the aromatic solvent also contained 9.1 percent isopropyl alcohol as a homogenizer diluent/solvent and it, finally contained 4.5 weight percent of a formula containing 33.3 percent heavy aromatic naphtha 59.72 weight percent of a naphthenic acid amido ethyl—2—napthanyl—2—imidazoline and 6.98 percent of an imidazoline obtained from a mixture of naphthenic acid and tall oil fatty acid.

This emulsified material obtained after agitation of the mill scale and water with the reactive ingredients above, was reacted or blended with from 1 to 10 weight percent of a sulfonated alcoholic mixture containing alcohol sulfonates having from 6 to 10 carbon atoms which alkyl sulfonates were absorbed on the iron and iron oxide surfaces to prevent reabsorption of oily components after they had been removed by the admixtures above.

TABLE I

| A. Mill Scale Sample | % Oil | % Water |
|---|---|---|
| #3 Cold Strip Scale Pit | 0.7 | 15.2 |
| 12" Bar Mill | 3.6 | 12.3 |
| 80" Pit | 5.2 | 16.2 |
| Main Storage Pile | 0.3 | 9.0 |
| #1 Scale Pit | 0.4 | 11.4 |
| #4 Slaber | 1.2 | 10.5 |

| B. Treatment Chemical* | Slurries (Mill Scale) | Percent Oil Removed | Concentration of Chemical Additive |
|---|---|---|---|
| 1 | 50% | 92%+ | 1800 ppm |
| 2 | 50% | 92%+ | 1800 ppm |
| 3 | 50% | 92%+ | 1800 ppm |

*Chemicals 1 & 2 are formulation described above.
Chemical 3 is an admixture of fatty alcohol sulfonates containing 6–10 carbon atoms.

TABLE II

| Sample Nos.: | 1 | 2 | 3 | 4 | 5 |
|---|---|---|---|---|---|
| Total Fe | 56.7 | 43.9 | 57.1 | 49.6 | 56.7 |
| FeO | 16.0 | 14.6 | 28.3 | 15.0 | 15.4 |
| Met Fe | <.1 | <.1 | <.1 | <.1 | 0.4 |
| $Fe_2O_3$ | 63.4 | 46.6 | 50.4 | 54.3 | 63.4 |
| LOI | 3.2 | 8.4 | 8.0 | 2.7 | 3.5 |
| CaO | 7.0 | 7.4 | 5.0 | 6.3 | 6.4 |
| MgO | 1.2 | 1.2 | 1.3 | 1.2 | 0.9 |
| $SiO_2$ | 2.1 | 12.3 | 7.2 | 2.2 | 2.1 |
| Oil | <0.1 | 0.6 | 8.0 | <0.1 | <0.1 |

All analyses reported in percent.

TABLE III

| WATER GLYCOL BULK FIRE RESISTANT FLUID |
|---|
| DECTOL 32 RBO |
| BULK CRANKCASE OIL |
| MULTI GRADE CRANKCASE |
| BULK MULTI GRADE |
| HEAVY DUTY JOURNAL |
| EXTREME PRES. GEAR OIL - AGMA |
| 400#/DRS 7,4/GAL EXTREME |
| BULK EXTREME PRESS GEAR OIL |
| BULK EXTREME PRESS GEAR OIL |
| LITHIUM SOAP E.P. |
| NO. 1 EP BLACK |
| BULK NO. 1 EP BLACK |
| MULTIPURPOSE EP GREASE |

The various mill scale samples are described in Table I. Table II shows that the use of the formulation described above removed 92 weight percent of the oil in each of the samples above in Table I. This oil was removed by mixing a slurry of mill scale in water with the preferred formulation containing the ingredients above, so that the mill scale concentration was about 50 weight percent, the formulation above was added to the mill scale slurry at concentrations ranging from about 0.01 to about 5.0 weight percent.

In each of the cases above, over 90 percent of the oil contamination was removed. The total recoverable oil and grease was measured using ASTM Method 413.2, Storet No. 00560, (spectrophotometric, infrared), which is incorporated herein by reference.

Other procedures available for measuring oil content on the mill scale includes those procedures indicated in the ASTM publications, 501, 503 Oil and Grease; 503A, Partition-Gravimetric Method; 503B, Partition-Infrared Method; and 503C Soxhlet Extraction Method, all of which are also incorporated herein by reference.

Table II presents varied analysis of a blast furnace mill scale obtained from a steel company in the Midwest. As can be seen, oil content can vary widely in various samples of mill scale.

Table III presents a typical analysis of the oily contaminants contained on a typical mill scale. As can be seen, these oily contaminants can be various mixtures containing various ratios of various contaminants, including, but not necessarily limited to, hydrocarbon oils, greases and lubricants, fatty acids, fatty acid esters, Gear oils, Lithium soaps, automatic transmission oils, turbine oils cutting oils, emulsifiable oils, and the like.

Having described our invention, we claim:

1. A process for removing oily contaminants from mill scale containing from 0.1 to about 10 weight percent oily contaminants which process consists essentially of:
    (a) suspending oily mill scale in water containing an effective de-oiling amount of a formulation consisting essentially of the ingredients:

| Ingredients | Percent |
| --- | --- |
| (1) medium aliphatic naphtha | 30-60 |
| (2) heavy aromatic naphtha | 1-7.5 |
| (3) linear and branched alkyl phenols | 5-15 |
| (4) alkoxylated alkyl phenols | 5-20 |
| (5) penta ethylene hexamine partial fatty acid amide | 0.5-2.0 |
| (6) alkyl and aromatic acid imidazolines | 1-5.0 | thereby forming an oily mill scale suspension; then
   (b) mixing said suspension to achieve dissolution and emulsion suspension of oily contaminants in water, thereby forming a de-oiled mill scale suspended in oily water,
   (c) separating the de-oiled mill scale from the oily water, and
   (d) optionally water rinsing the de-oiled mill scale to form a rinsed mill scale
   (e) treating the oily water to remove oily contaminants from the oily water thereby recovering waste oils and treated fresh water, and then
   (f) recycling at least a portion of the treated fresh water to form the oily mill scale suspension of step (a), and recovering the waste oils.

2. The process of claim 1 wherein the water used to rinse the de-oiled mill scale contains an iron oxide surface attractive amount of a $C_6$-$C_{10}$ alcohol sulfonate to form an oil repellant surface on the de-oiled mill scale.

3. The process of claim 1 wherein the formulation contains:

| Ingredients | Percentage |
| --- | --- |
| (1) medium aliphatic naphtha | 40-55 |
| (2) heavy aromatic naphtha | 1.5-5.0 |
| (3) linear and/or branched alkyl alcohols | 7.5-12.5 |
| (4) alkoxylated alkyl phenols | 7.5-17.5 |
| (5) pentaethylene hexamine-partial fatty acid amide | 1.0-2.0 |
| (6) alkyl and aromatic acid imidazolines | 2.0-4.0 |

4. The process of claim 3 wherein the water used to rinse the de-oiled mill scale contains an iron/iron oxide surface attractive amount of a fatty alcohol sulfonate containing from six to ten carbon atoms.

* * * * *